(12) United States Patent
Lu et al.

(10) Patent No.: US 12,383,822 B2
(45) Date of Patent: Aug. 12, 2025

(54) CONTROL DEVICE

(71) Applicant: DEXIN CORPORATION, New Taipei (TW)

(72) Inventors: Ho-Lung Lu, New Taipei (TW); Hung-Yi Fan, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 355 days.

(21) Appl. No.: 18/146,385

(22) Filed: Dec. 25, 2022

(65) Prior Publication Data

US 2024/0082700 A1    Mar. 14, 2024

(30) Foreign Application Priority Data

Sep. 13, 2022 (TW) .................................. 111134433

(51) Int. Cl.
*A63F 13/24* (2014.01)
*A63F 13/92* (2014.01)

(52) U.S. Cl.
CPC .............. *A63F 13/24* (2014.09); *A63F 13/92* (2014.09)

(58) Field of Classification Search
CPC ................................ A63F 13/24; A63F 13/92
See application file for complete search history.

(56) References Cited

U.S. PATENT DOCUMENTS

| 9,126,119 | B2* | 9/2015 | Joynes | G06F 3/0219 |
| 9,539,507 | B2* | 1/2017 | Schoenith | A63F 13/24 |
| 11,437,841 | B2* | 9/2022 | Gonzalez | H02J 50/10 |
| 2021/0275907 | A1* | 9/2021 | Khaira | A63F 13/92 |
| 2023/0050323 | A1* | 2/2023 | Lu | A63F 13/92 |

* cited by examiner

*Primary Examiner* — Yingchuan Zhang
(74) *Attorney, Agent, or Firm* — Li & Cai Intellectual Property Office

(57) ABSTRACT

A control device used for holding an electronic device having a display is provided. The control device includes two control handles, a connection structure, a support structure, a moving mechanism, and a movable module. The two control handles are connected to each other through the connection structure. The support structure is connected to the connection structure. The moving mechanism is connected to the support structure. The movable module includes a carrier platform and two holding assemblies. The carrier platform is connected to the support structure through the moving mechanism. The two holding assemblies are connected to the carrier platform, and the two holding assemblies are configured to cooperatively hold the electronic device that is disposed on the carrier platform. The carrier platform can be operated to move forward or backward relative to the two control handles.

9 Claims, 17 Drawing Sheets

CONTROL DEVICE

CROSS-REFERENCE TO RELATED PATENT APPLICATION

This application claims the benefit of priority to Taiwan Patent Application No. 111134433, filed on Sep. 13, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a control device, and more particularly to a control device having two handles and being capable of holding a smart electronic device (e.g., a mobile phone or a tablet computer).

BACKGROUND OF THE DISCLOSURE

In the related art, a conventional game handle used for a mobile phone only has the function of holding the mobile phone in place. Therefore, when a user uses the conventional game handle to play mobile games for an extended period of time, soreness can easily develop in his/her hands.

SUMMARY OF THE DISCLOSURE

In response to the above-referenced technical inadequacy, the present disclosure provides a control device, which can be used to improve on the problem that a conventional game handle for a mobile phone only has the function of holding the mobile phone, so that it is difficult for a user to play a game therewith for long periods of time.

In one aspect, the present disclosure provides a control device for holding an electronic device. The electronic device has a display. The control device includes two control handles, a connection structure, a support structure, a moving mechanism, and a movable module. Each of the control handles includes a plurality of operation units, and each of the operation units is operable to send a control signal to the electronic device. The connection structure is connected between the two control handles, and an accommodation space is formed between the two control handles. The support structure is disposed on the connection structure, and the support structure is located between the two control handles. The moving mechanism is disposed on the support structure. The movable module includes a carrier platform and at least two holding assemblies. The carrier platform is configured to carry the electronic device. The carrier platform is connected to the moving mechanism, and the carrier platform is operable to move relative to the support structure by the moving mechanism. The at least two holding assemblies are connected to the carrier platform. The at least two holding assemblies are configured to hold the electronic device that is disposed on the carrier platform. The carrier platform is operable to move forwards or backwards relative to the two control handles by the movement mechanism. The electronic device that is disposed on the carrier platform and held by the at least two holding assemblies is capable of moving forward or backward along with the carrier platform relative to the two control handles.

Therefore, the control device of the present disclosure enables a user to move the electronic device that is disposed on the carrier platform and held by the two holding assemblies forward or backward relative to the two control handles according to practical requirements. In addition, an overall center of gravity of the control device can be shifted, so that the user can hold the two control handles in a more comfortable posture. Accordingly, it becomes less likely for the user to develop soreness in their hands, even after extended usage of the control handles.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
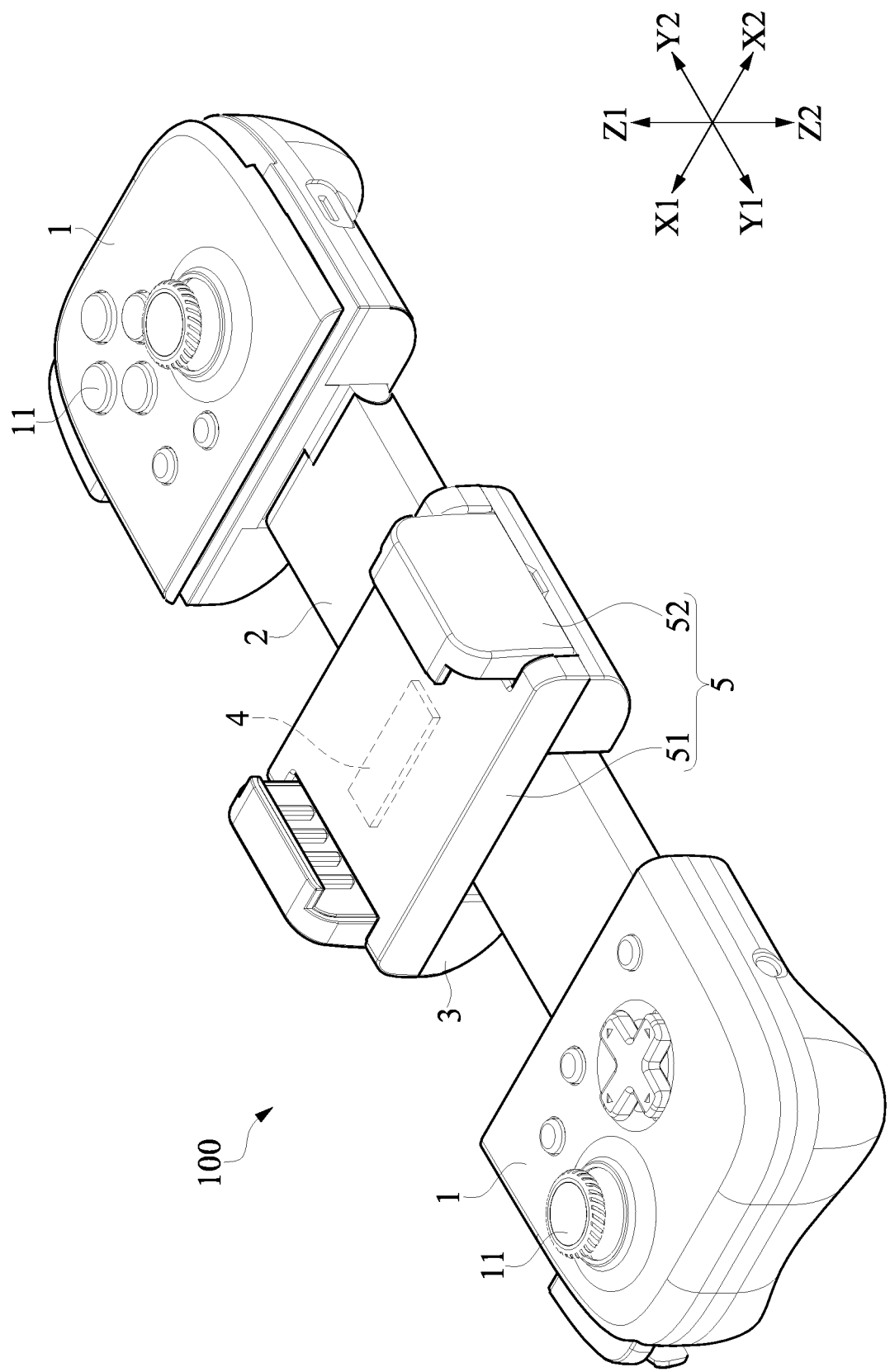
FIG. 1 is a perspective view of a control device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the following descriptions, a text description of "referring to a specific figure" or "as shown in a specific figure" is only used to emphasize that most of related contents described in a subsequent description appears in the specific figure. However, the present disclosure is not limited that only the specific figure may be referred to in the subsequent description. In the following descriptions, forward, backward, left, right, upward, and downward directions are directions indicated by X1, X2, Y1, Y2, Z1, and Z2 that are indicated in the figures, respectively.

Figure 2:
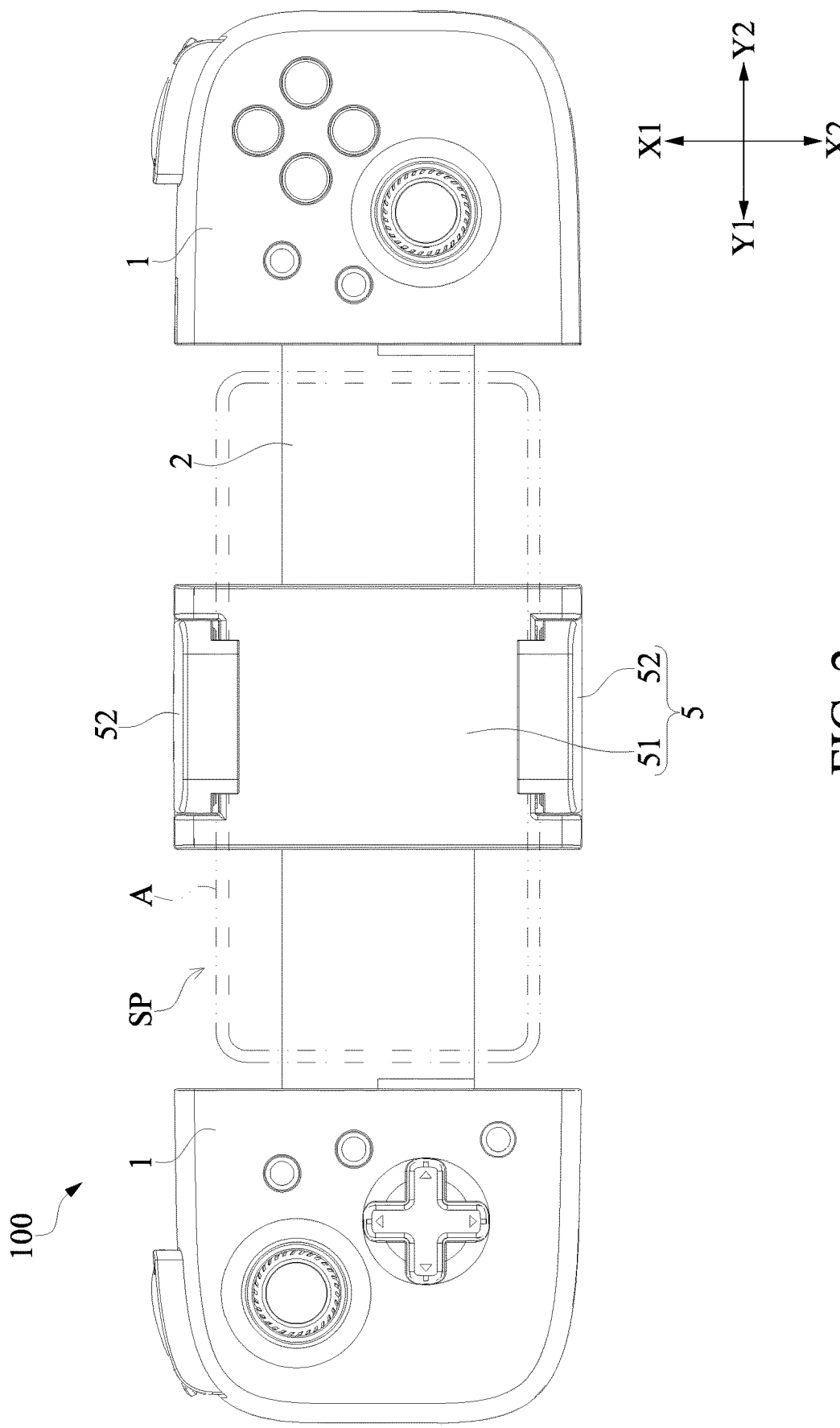
FIG. 2 to FIG. 4 are top views respectively showing a carrier platform of the control device that is located at different positions according to the first embodiment of the present disclosure.
Figure 3:
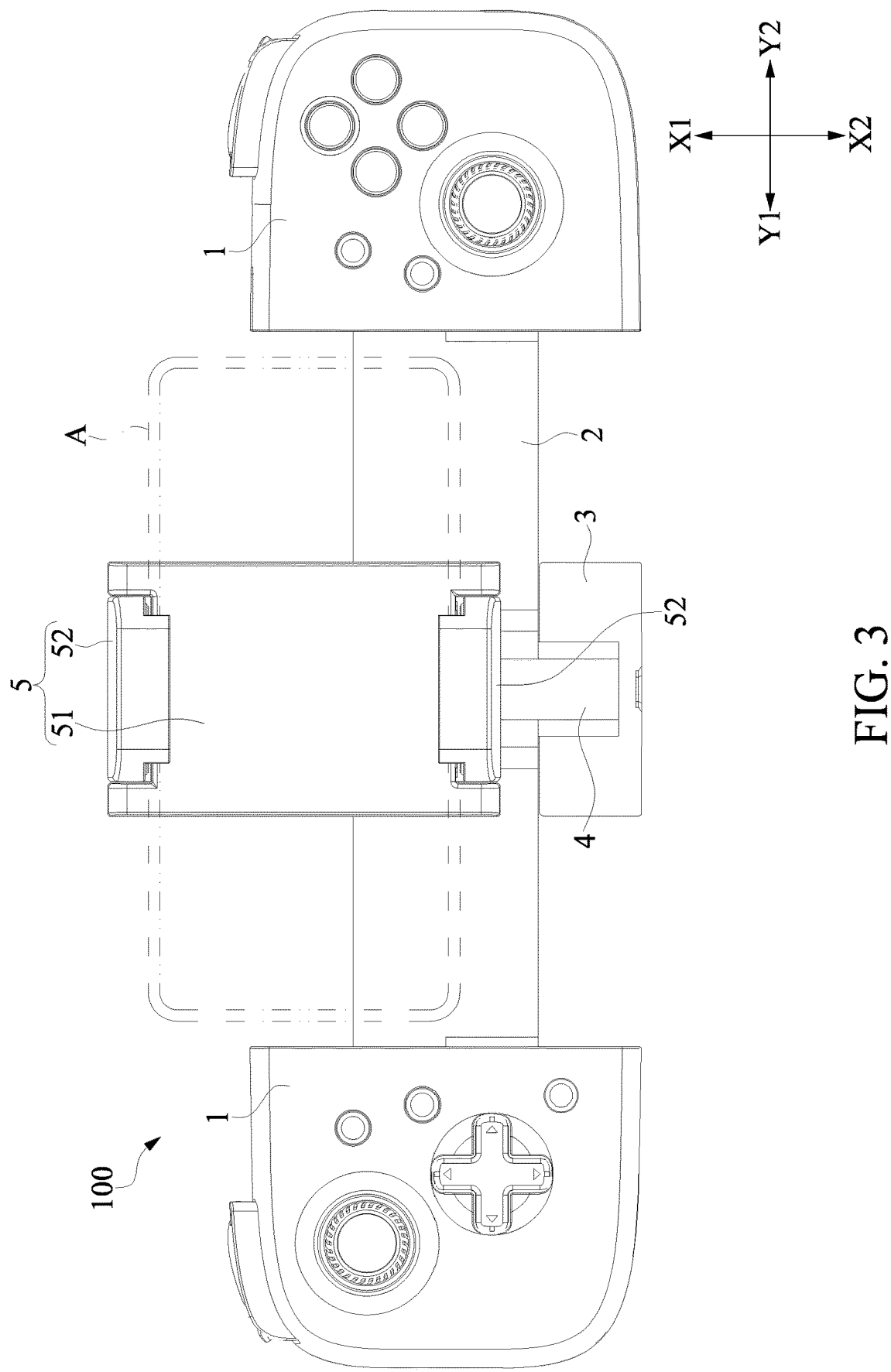
Figure 4:
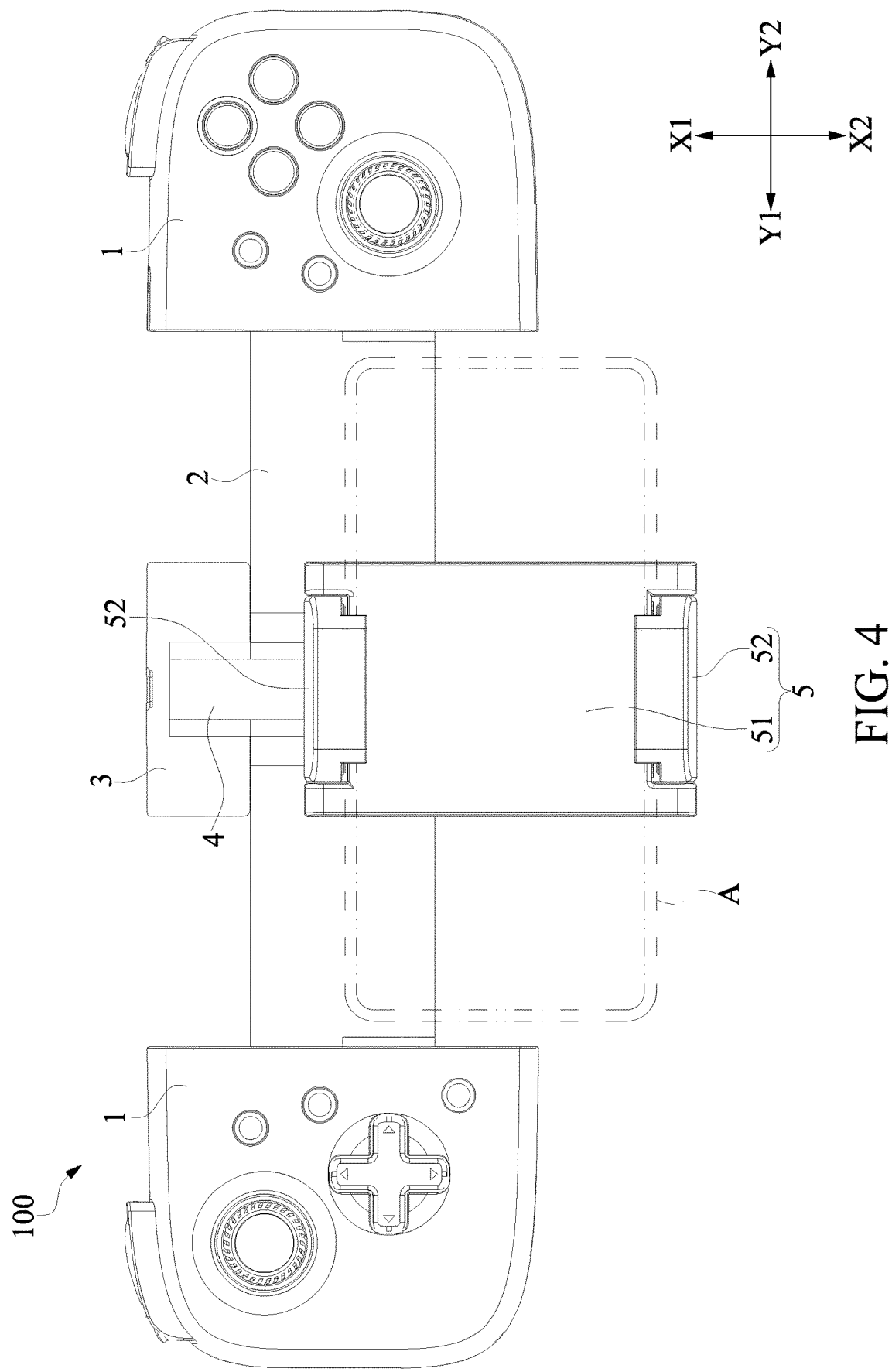

Referring to FIG. 1 to FIG. 4, FIG. 1 is a perspective view of a control device according to a first embodiment of the present disclosure. FIG. 2 to FIG. 4 are top views each showing a carrier platform of the control device being located at different positions according to the first embodiment of the present disclosure. The present disclosure provides a control device 100 that is configured to hold an electronic device A. The electronic device A includes a display. The electronic device A can be, for example, a mobile phone or a tablet computer, but the present disclosure is not limited thereto.

The control device 100 includes two control handles 1, a connection structure 2, a support structure 3, a moving mechanism 4, and a movable module 5. Each of the control handles 1 includes a plurality of operation units 11, and each of the operation units 11 can be operated by a user to send a control signal to the electronic device A. In a practical application, at least one of the operation units 11 can be a physical button, and at least another one of the operation units 11 can be a touch pad, but the present disclosure is not limited thereto. The quantity of the operation units 11 of each of the control handles 1 and the arrangement of the plurality of operation units 11 are not limited to those shown in the figures. Each of the control handles 1 can include a rechargeable battery and a related charging module (e.g., a USB connector) that are disposed therein.

The connection structure 2 is connected between the two control handles 1, and an accommodation space SP is formed between the two control handles 1. In a practical application, the accommodation space SP is configured to accommodate a smartphone or a small tablet that is placed horizontally, but the present disclosure is not limited thereto. The connection structure 2 is configured to connect the two control handles 1. The appearance and the size of the connection structure 2 are not limited to those shown in the figures. A manner of connection between the connection structure 2 and each of the control handles 1 is not limited to those shown in the figures.

In a practical application, the connection structure 2 and each of the control handles 1 can be fixed to each other in a non-detachable manner. Alternatively, the connection structure 2 and each of the control handles 1 can be fixed to each other in a detachable manner. In addition, the connection structure 2 and each of the control handles 1 can be connected to each other in a movable manner. Alternatively, the connection structure 2 and each of the control handles 1 can be connected to each other in a non-movable manner.

The support structure 3 is disposed on the connection structure 2, and the support structure 3 is located between the two control handles 1. The moving mechanism 4 is disposed on the support structure 3. In a practical application, the support structure 3 can be connected to the connection structure 2 in a detachable manner. Alternatively, the support structure 3 can be integrally connected to the connection structure 2. The support structure 3 can be located at a central position between the two control handles 1, but the present disclosure is not limited thereto.

In a practical application, when the support structure 3 is fixed on the connection structure 2, the support structure 3 is not operable to move relative to the connection structure 2. However, the manner of connection between the support structure 3 and the connection structure 2 are not limited to those shown in the figures. In a particular application, the support structure 3 can be connected to the connection structure 2 in a movable manner, so that the support structure 3 can be operated to move closer to or further away from any one of the control handles 1, but the present disclosure is not limited thereto.

The movable module 5 includes a carrier platform 51 and two holding assemblies 52. The carrier platform 51 is configured to carry an electronic device A. The carrier platform 51 is connected to the moving mechanism 4. The carrier platform 51 can be operated to move forward (i.e., in the X1 direction as indicated in FIG. 1 to FIG. 4) or backward (i.e., in the X2 direction as indicated in FIG. 1 to FIG. 4) relative to the support structure 3 by the moving mechanism 4. The appearance of the carrier platform 51 can be changed according to practical requirements, and is not limited to those shown in the figures. In a special embodiment, the carrier platform 51 can include a wireless charging module disposed therein. The electronic device A disposed on the carrier platform 51 can be charged in a wireless manner through the wireless charging module by a rechargeable battery disposed in the carrier platform 51 or a power supply connected to the wireless charging module.

The two holding assemblies 52 are connected to the carrier platform 51. The two holding assemblies 52 are configured to hold the electronic device A that is disposed on the carrier platform 51. The two holding assemblies 52 are disposed on two opposite ends of the carrier platform 51, respectively. Each of the holding assemblies 52 can be connected to one end of an elastic member (e.g., a spring member). Another end of the elastic member can be fixed to the support structure 3. When one of the holding assemblies 52 is operated to move away from another one of the holding assemblies 52, the elastic member connected to the holding assembly 52 that is operated is stretched, thereby generating an elastic restoring force. Accordingly, the two holding assemblies 52 can firmly hold the electronic device A that is disposed on the carrier platform 51 by the elastic restoring force generated by the elastic member connected thereto.

A manner of connection between the carrier platform 51 and the support structure 3 can be changed according to practical requirements. For example, the carrier platform 51 can be connected to the support structure 3 through a slide rail and a slide block. Accordingly, the carrier platform 51 can be operated to move relative to the support structure 3.

As shown in FIG. 2 to FIG. 4, after the electronic device A is disposed on the carrier platform 51 by a user to enable the two holding assemblies 52 to hold the electronic device A, the electronic device A can be operated by the user according to practical requirements, so that the carrier platform 51 can be moved forward (i.e., in the X1 direction as indicated in the figures) or backward (i.e., in the X2 direction as indicated in the figures) relative to the two control handles 1 through the moving mechanism 4. Therefore, a position of an overall center of gravity of the control device 100 on which the electronic device A is disposed can be adjusted by the user according to practical requirements, so that the control device 100 can be held in a more comfortable manner by the user.

In addition, through the design that the carrier platform 51 can be operated and moved relative to the two control handles 1, the user can change a position of the carrier platform 51 after holding the two control handles 1 for a period of time, so as to allow the user to hold the control device 100 with different postures. Therefore, the user is less likely to suffer from soreness after using the control device 100 for a long period of time.

Figure 5:
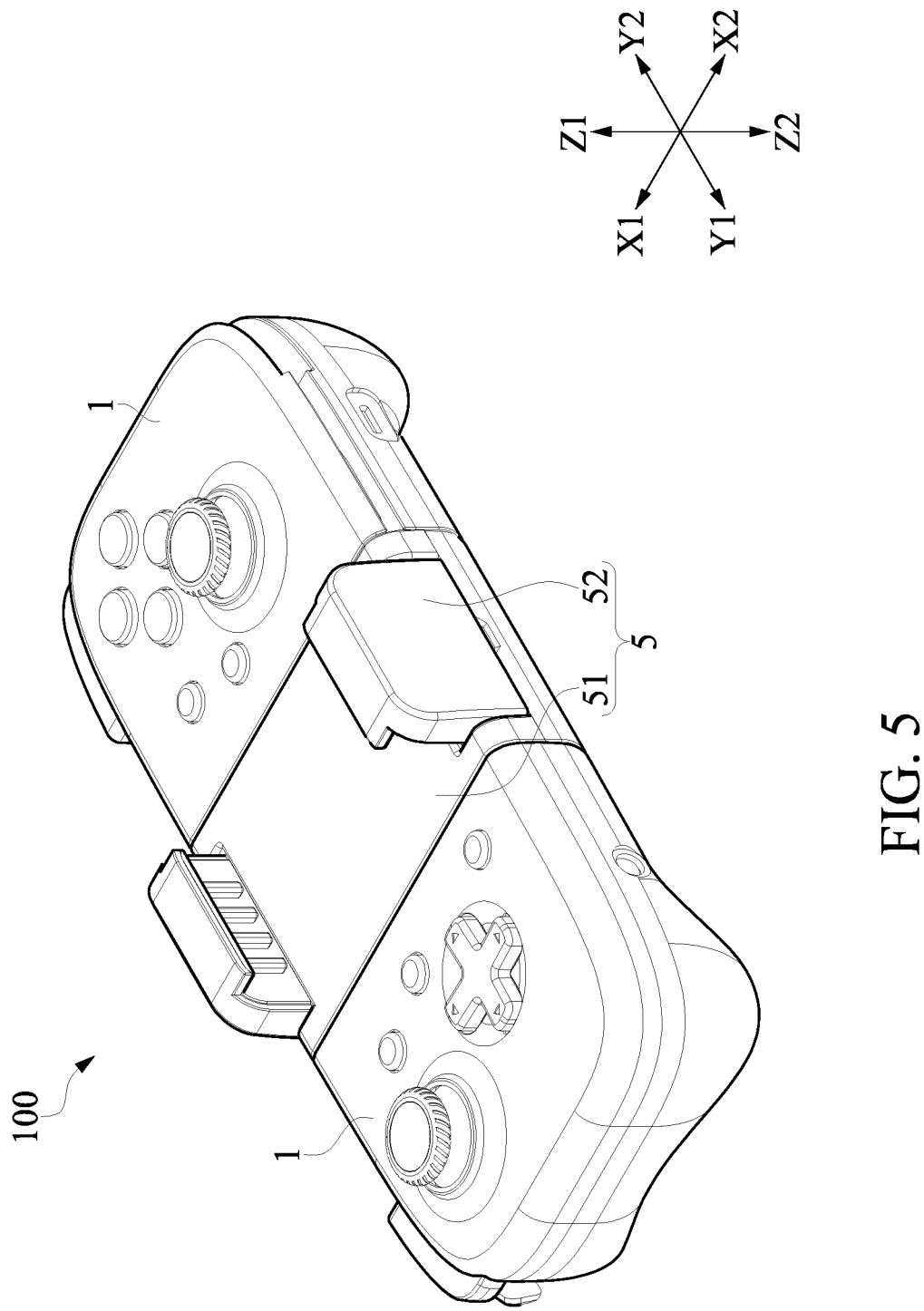
FIG. 5 is a perspective view of a control device according to a second embodiment of the present disclosure.

Referring to FIG. 5, FIG. 5 is a perspective view of a control device according to a second embodiment of the present disclosure. The main difference between the present embodiment and the previous embodiment is that: the two control handles 1 respectively have two accommodation grooves formed therein (not shown in FIG. 5), and each of the accommodation grooves is configured to accommodate a part of the connection structure 2. Each of the control handles 1 can be operated by a user, so that the accommodation groove of each of the control handles 1 accommodates at least a part of the connection structure 2 adjacent thereto, thereby shortening a distance between each of the control handles 1 and the support structure 3. That is, based on the directions indicated in FIG. 5, each of the control handles 1 can be moved by the user to a left direction (i.e., the Y1 direction as indicated in FIG. 5) or a right direction (i.e., the Y2 direction as indicated in FIG. 5) according to practical requirements, so that a distance between each of the control handles 1 and the carrier platform 51 is changed.

In the present embodiment, each of the control handles 1 can completely accommodate the connection structure 2 adjacent thereto, but the present disclosure is not limited thereto. In a different embodiment of the present disclosure, the support structure 3 has two accommodation grooves formed therein (not shown in the figures). A part of the connection structure 2 is accommodated in the accommodation grooves of the two control handles 1, and another part of the connection structure 2 is accommodated in the accommodation grooves of the support structure 3.

The relevant structural design of the connection structure 2 being accommodated in the accommodation grooves of the control handles 1 can be changed according to actual needs, and the present disclosure is not limited thereto. For example, each of the control handles 1 can include a slide rail disposed in the accommodation groove thereof. One end of the connection structure 2 can be slidably connected to the slide rail disposed in the accommodation groove of the control handle 1. Accordingly, the connection structure 2 can be accommodated in the control handle 1 through the slide rail. Alternatively, each of the accommodation grooves can have two guide slots formed therein. The connection structure 2 can have two columnar structures. The two columnar structures can be movably engaged with the two guide slots, respectively. The connection structure 2 can move toward the accommodation groove through a mutual cooperation between the two columnar structures and the two guide slots.

Figure 6:
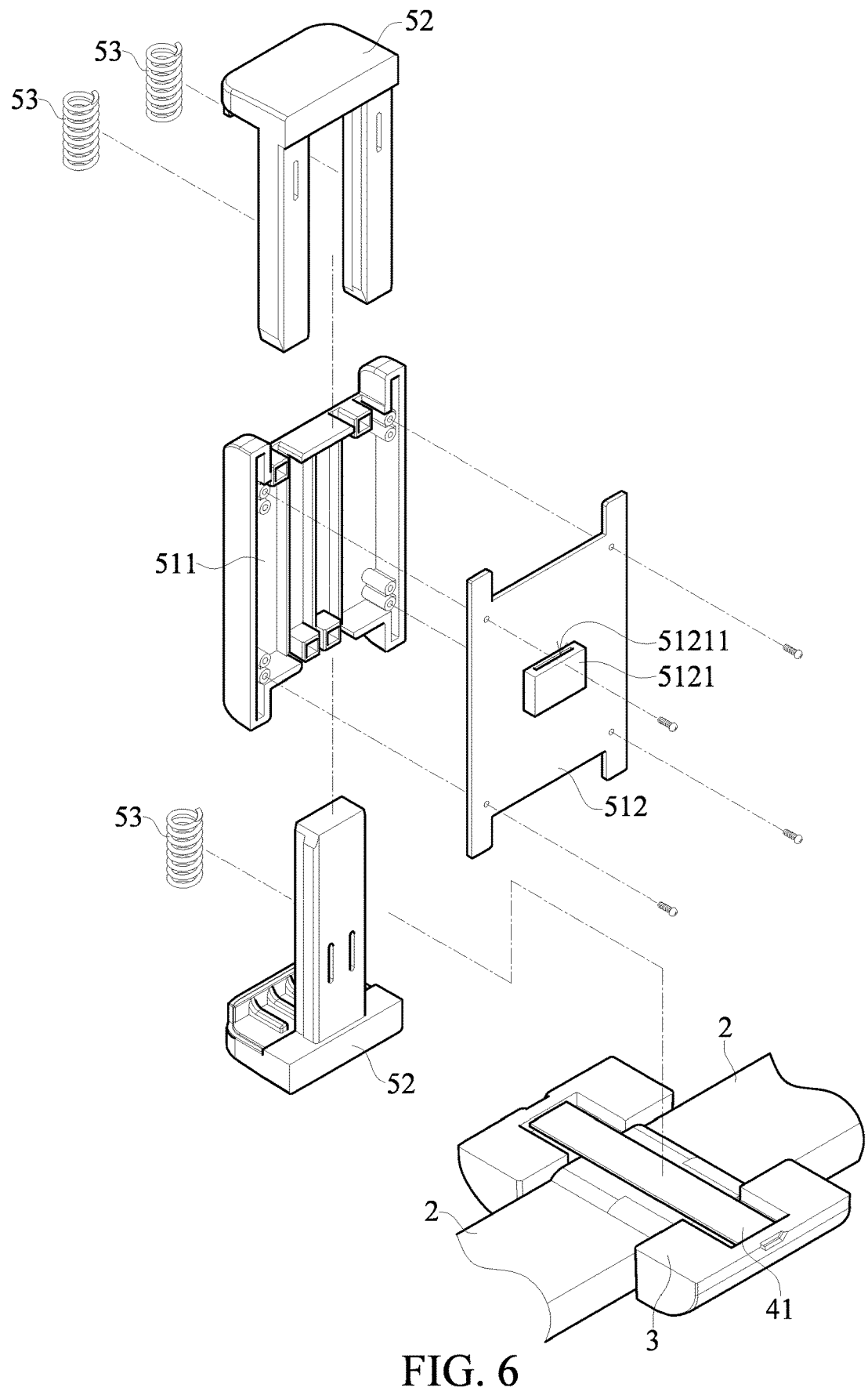
FIG. 6 is an exploded view of a carrier platform, a support structure, and a connection structure of a control device according to a third embodiment of the present disclosure.

Referring to FIG. 6, FIG. 6 is an exploded view of a carrier platform, a support structure, and a connection structure of a control device according to a third embodiment of the present disclosure. The main difference between the present embodiment and the previous embodiment is that: the carrier platform 51 has a main body 511 and a cover body 512. The cover body 512 is detachably disposed on one side of the main body 511. Parts of the two holding assemblies 52 are disposed between the cover body 512 and the main body 511. The two holding assemblies 52 can be moved relative to the main body 511 and the cover body 512. Two elastic members 53 (i.e., two springs) are correspondingly disposed between the cover body 512 and the main body 511. One end of each of the elastic members 53 is fixed to the main body 511, and another end of each of the elastic members 53 is connected to one of the holding assemblies 52.

One side of the cover body 512 has a clamping structure 5121. The moving mechanism 4 includes a guide member 41. The guide member 41 is a rectangular sheet-like structure. Two ends of the guide member 41 are fixed to the support structure 3. A gap is formed between the guide member 41 and the support structure 3. The clamping structure 5121 clamps the guide member 41. The main body 511 can be operated to enable the clamping structure 5121 to move along with the main body 511 relative to the guide member 41.

More specifically, the clamping structure 5121 can be made of an elastic material such as rubber. The clamping structure 5121 can be a rectangular body that has an intermediate channel 51211. An inner diameter of the intermediate channel 51211 is slightly less than an outer diameter of the guide member 41. When the guide member 41 passes through the intermediate channel 51211, the clamping structure 5121 is elastically deformed, so as to firmly clamp the guide member 41. Through the design of the clamping structure 5121 and the guide member 41, a position of the carrier platform 51 relative to the support structure 3 can be adjusted by a user in a stepless manner according to practical requirements.

It should be noted that the shape of the clamping structure 5121 is not limited to that shown in FIG. 6. In a different embodiment of the present disclosure, the clamping structure 5121 can include two hook arms. A space between the two hook arms can be in spatial communication with an external environment. The quantity and the arrangement of the clamping structure 5121 of the cover body 512 and the quantity and the arrangement of the guide member 41 are not limited to those shown in FIG. 6, and such details in design can be changed according to practical requirements.

Figure 7:
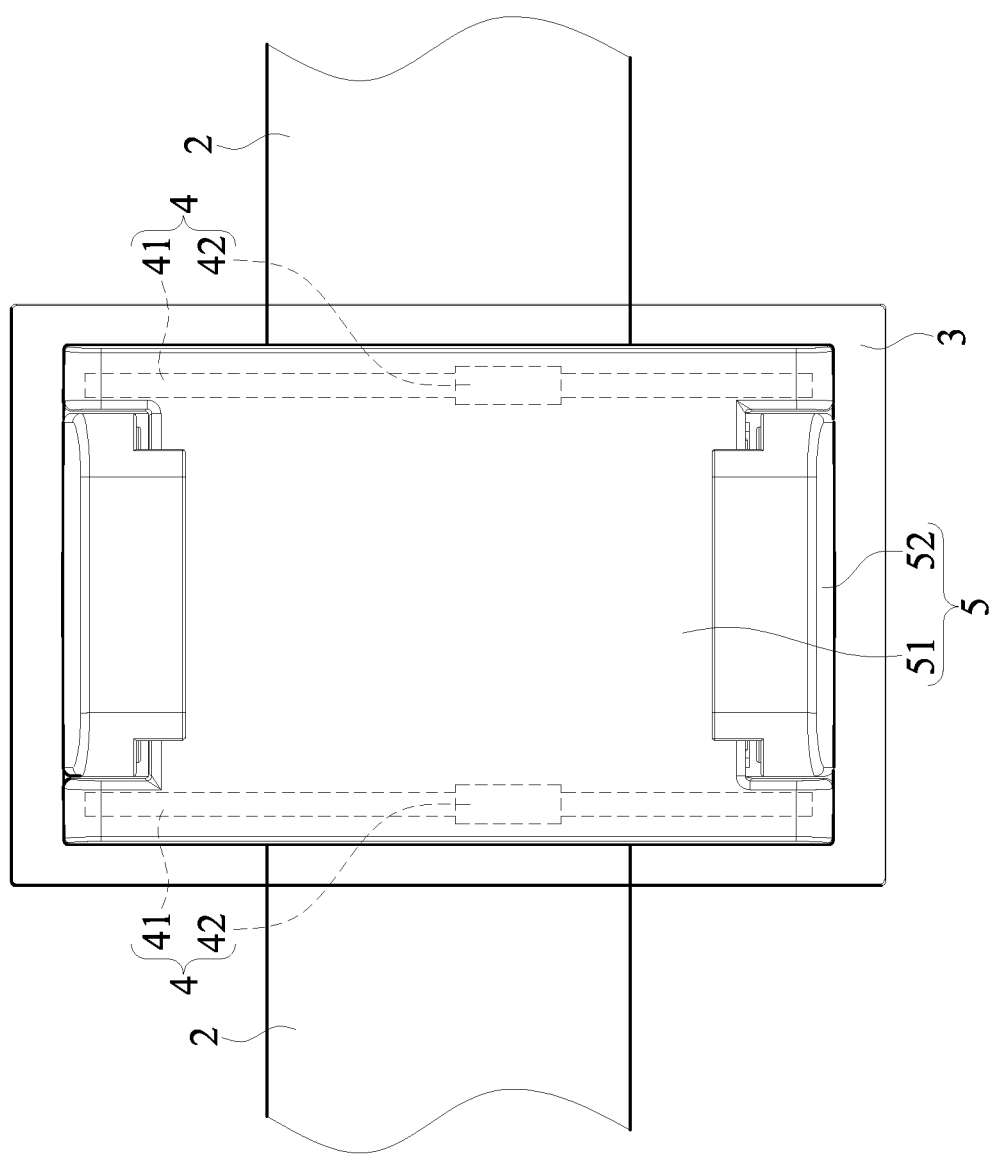
FIG. 7 is a top view of a carrier platform, a support structure, and a connection structure of a control device according to a fourth embodiment of the present disclosure.

Referring to FIG. 7, FIG. 7 is a top view of a carrier platform, a support structure, and a connection structure of a control device according to a fourth embodiment of the present disclosure. In a practical application of the present disclosure, the moving mechanism 4 can include two guide members 41 and two slide blocks 42. The two guide members 41 can be disposed on the support structure 3, correspondingly. The two guide members 41 can be arranged side by side to each other. The two slide blocks 42 are respectively and slidably disposed on the two guide members 41. The two slide blocks 42 can slide on the two guide members 41, respectively. The two sides of the carrier platform 51 can be connected to the two slide blocks 42, respectively. The carrier platform 51 can be operated to slide relative to the support structure 3 through the two slide blocks 42 and the two guide members 41.

The quantities of the guide members 41 and the slide blocks 42 of the moving mechanism 4 are not limited to those shown in FIG. 7. In a different embodiment of the present disclosure, the moving mechanism 4 can include only a single guide member 41 and a single slide block 42. Alternatively, the moving mechanism 4 can include three or more guide members 41 and three or more slide blocks 42. It should be noted that, each of the guide members 41 and a corresponding slide block 42 referred to herein can be a multi-segment slide rail that is commercially available, or a non-segment slide rail that is commercially available, and the present disclosure is not limited thereto.

Figure 8:
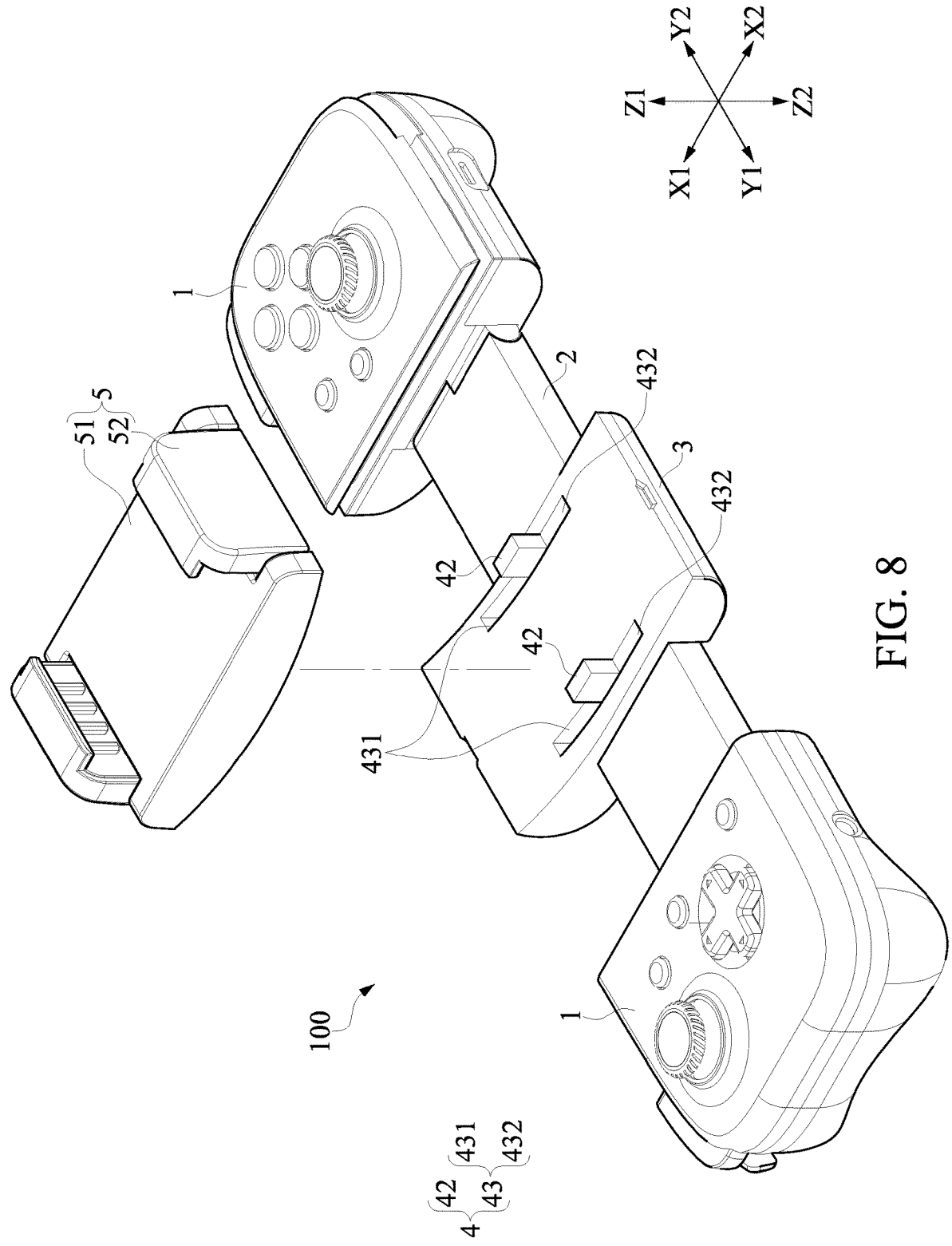
FIG. 8 is an exploded view of a control device according to a fifth embodiment of the present disclosure.
Figure 9:
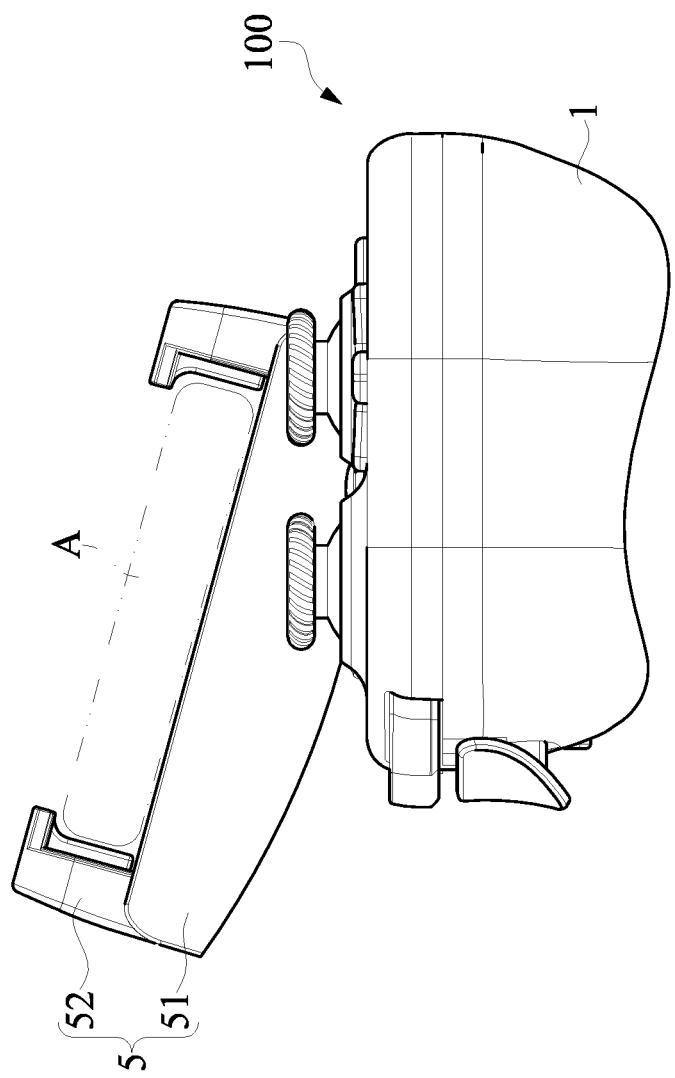
FIG. 9 is a side view of the control device according to the fifth embodiment of the present disclosure.

Referring to FIG. 8, which is to be read in conjunction with FIG. 9, FIG. 8 is an exploded view of a control device according to a fifth embodiment of the present disclosure. FIG. 9 is a side view of the control device according to the fifth embodiment of the present disclosure. The main difference between the present embodiment and the previous embodiment is that: the moving mechanism 4 includes two slide blocks 42 and two guide structures 43. Each of the guide structures 43 can be a slide slot or a slide rail. Each of the guide structures 43 can include an arc section 431 and a linear section 432. When the carrier platform 51 is operated to move forward (i.e., in the X1 direction as indicated in FIG. 8) relative to the two control handles 1, the carrier platform 51 moves along the arc section 431 through the two slide blocks 42, and then the carrier platform 51 further moves forward (i.e., in the X1 direction as indicated in FIG. 8) and upward (i.e., in the Z1 direction as indicated in FIG. 8).

As shown in FIG. 9, when the carrier platform 51 is operated by a user to move forward, the carrier platform 51 synchronously moves upward (i.e., in the Z1 direction as indicated in FIG. 9), such that the electronic device A that is disposed on the carrier platform 51 and held by the two holding assemblies 52 is in an inclined state, so as to allow the user to view a screen of the electronic device A more conveniently.

Conversely, when the carrier platform 51 is operated by the user to move backward relative to the two control handles 1, the carrier platform 51 moves along the two linear sections 432 by the two slide blocks 42. During the backward movement, the carrier platform 51 does not move upward (i.e., in the Z1 direction as indicated in FIG. 9) or downward (i.e., in the Z2 direction as indicated in FIG. 9).

Figure 10:
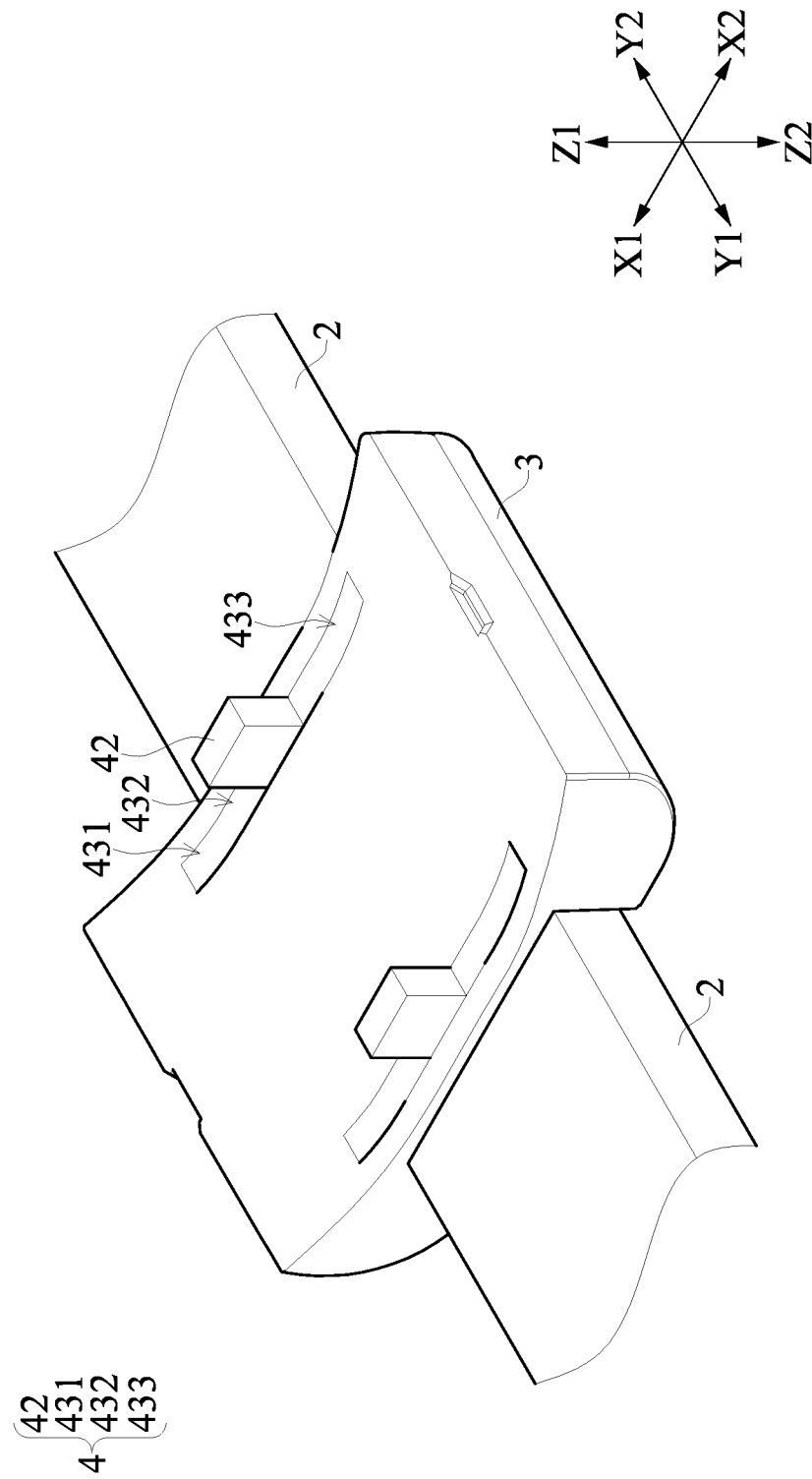
FIG. 10 is a partial view of a support structure and a connection structure of a control device according to a sixth embodiment of the present disclosure.

Referring to FIG. 10, FIG. 10 is a partial view of a support structure and a connection structure of a control device according to a sixth embodiment of the present disclosure. The main difference between the present embodiment and the above-mentioned fifth embodiment is that: each of the guide structures 43 can include a first arc section 431, a second arc section 433, and a linear section 432, in which the linear section 432 is located between the first arc section 431 and the second arc section 433. When the carrier platform 51 is operated to move forward (i.e., in the X1 direction as indicated in FIG. 10) relative to the two control handles 1, the carrier platform 51 moves along the first arc section 431 through the two slide blocks 42, and the carrier platform 51 simultaneously moves forward (i.e., in the X1 direction as indicated in FIG. 10) and upward (i.e., in the Z1 direction as indicated in FIG. 10). Conversely, when the carrier platform 51 is operated to move backward (i.e., in the X2 direction as indicated in FIG. 10) relative to the two control handles 1, the carrier platform 51 moves along the second arc section 433 through the two slide blocks 42, and the carrier platform 51 simultaneously moves backward (i.e., in the X2 direction as indicated in FIG. 10) and upward (i.e., in the Z1 direction as indicated in FIG. 10). When the carrier platform 51 is operated to move within a range of the linear section 432 through the two slide blocks 42, the carrier platform 51 only moves forward (i.e., in the X1 direction as indicated in FIG. 10) or backward (i.e., in the X2 direction as indicated in FIG. 10), and does not move upward (i.e., in the Z1 direction as indicated in FIG. 10).

Figure 11:
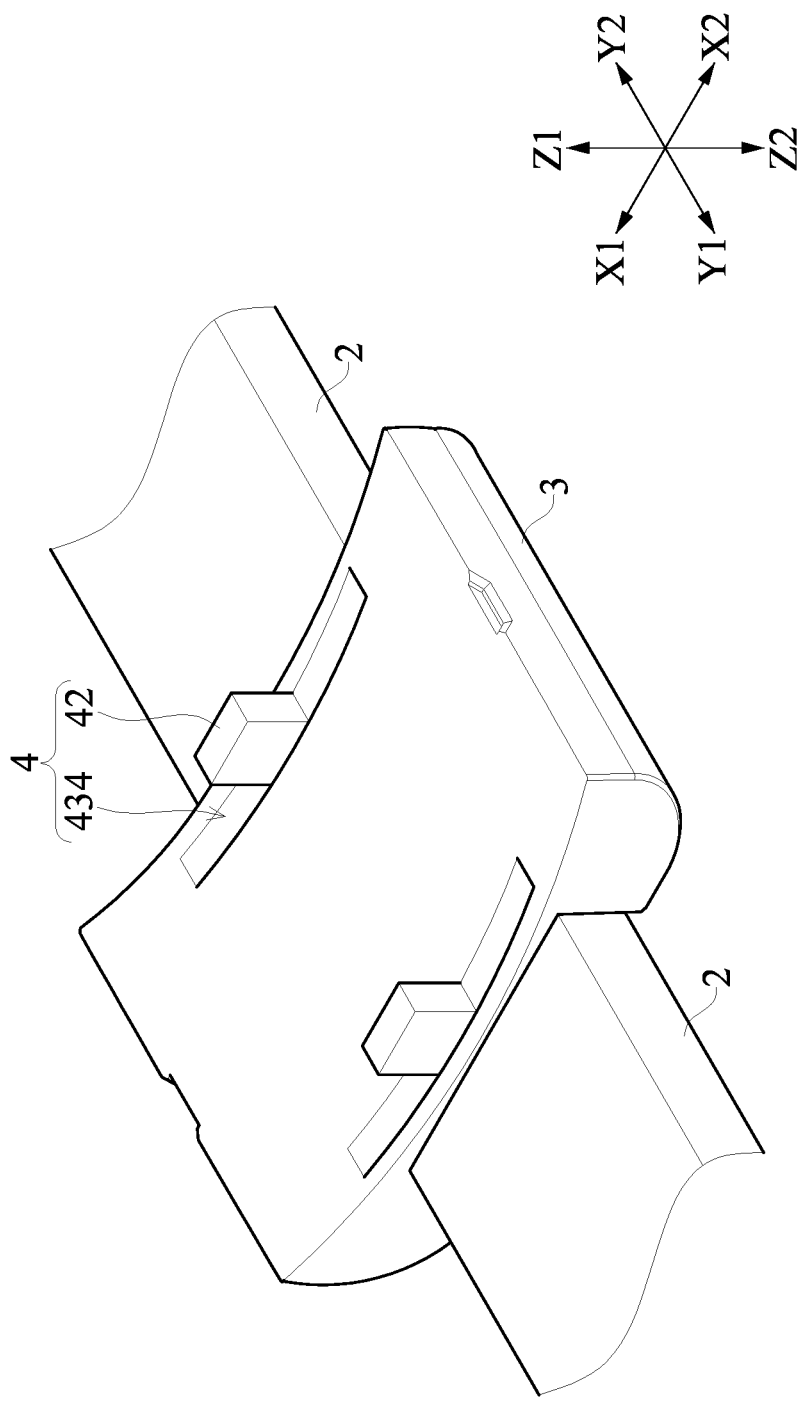
FIG. 11 is a partial view of a support structure and a connection structure of a control device according to a seventh embodiment of the present disclosure.

Referring to FIG. 11, FIG. 11 is a partial view of a support structure and a connection structure of a control device according to a seventh embodiment of the present disclosure. The main difference between the present embodiment and the above-mentioned sixth embodiment is that: each of the guide structures 43 can include only a single arc section 434. When the carrier platform 51 is operated to move forward (i.e., in the X1 direction as indicated in FIG. 11) relative to the two control handles 1, the carrier platform 51 simultaneously moves upward (i.e., in the Z1 direction as indicated in FIG. 11). When the carrier platform 51 is operated to move backward (i.e., in the X2 direction as indicated in FIG. 11), the carrier platform 51 simultaneously moves upward (i.e., in the Z1 direction as indicated in FIG. 11).

It is worth mentioning that, in any one of the above-mentioned embodiments, two opposite side walls of the slide rail (i.e., the guide structure 43) can each have a plurality of perforations. The slide block 42 can have a ball attached to a spring. A portion of the ball can be accommodated in one of the perforations. Therefore, when the carrier platform 51 is operated to move relative to the support structure 3, the ball that is originally accommodated in the perforation exits the perforation along with the slide block 42 until the carrier platform 51 is no longer operated, and then the portion of the ball of the slide block 42 enters an adjacent one of the perforations due to an action of the spring. Accordingly, a user can clearly feel when the carrier platform 51 has reached a predetermined position. By virtue of the above-mentioned structural design, the user can clearly know whether or not the carrier platform 51 is currently located at a relatively stable position.

Figure 12:
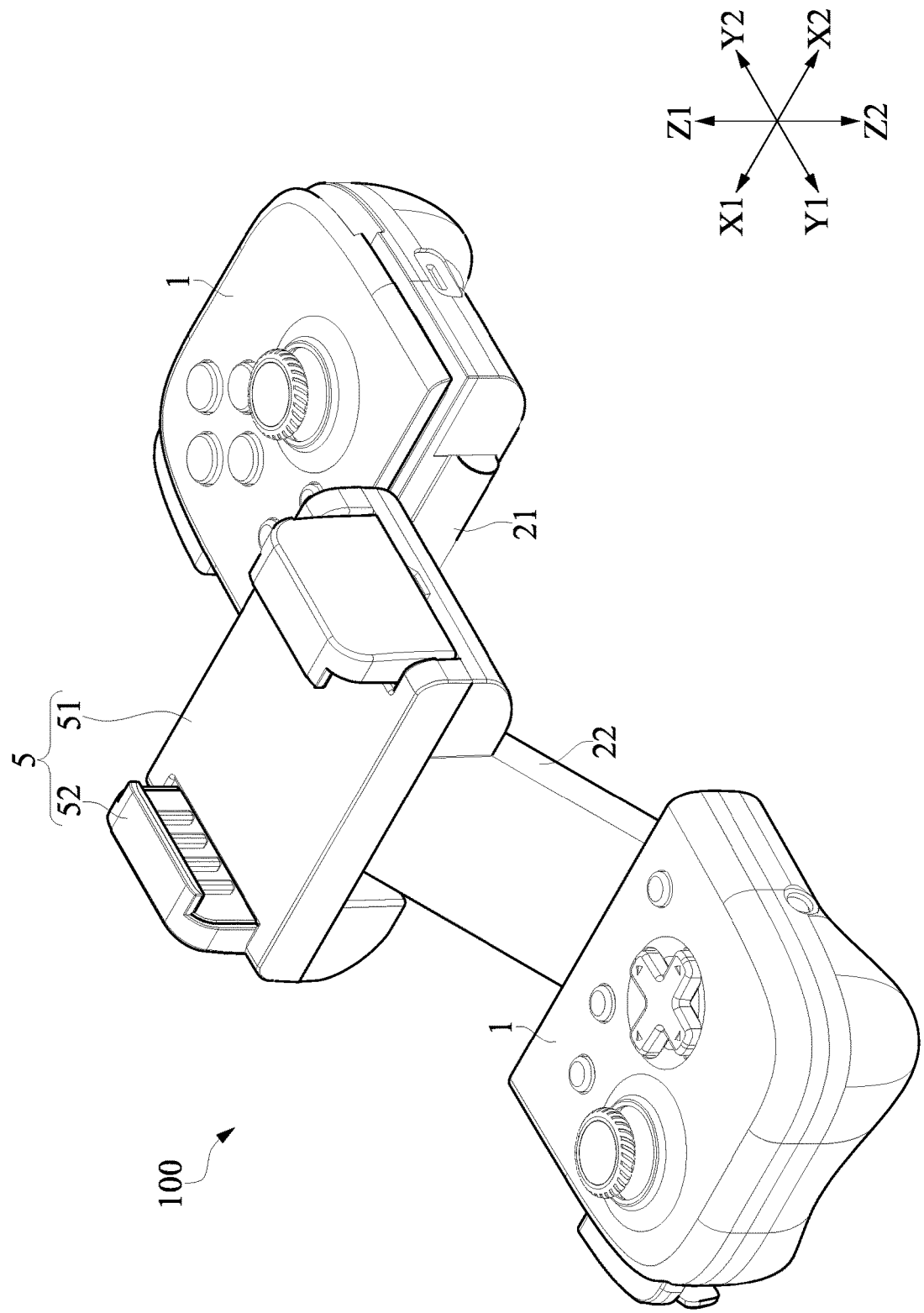
FIG. 12 is a perspective view of a control device in an operated state according to an eighth embodiment of the present disclosure.
Figure 13:
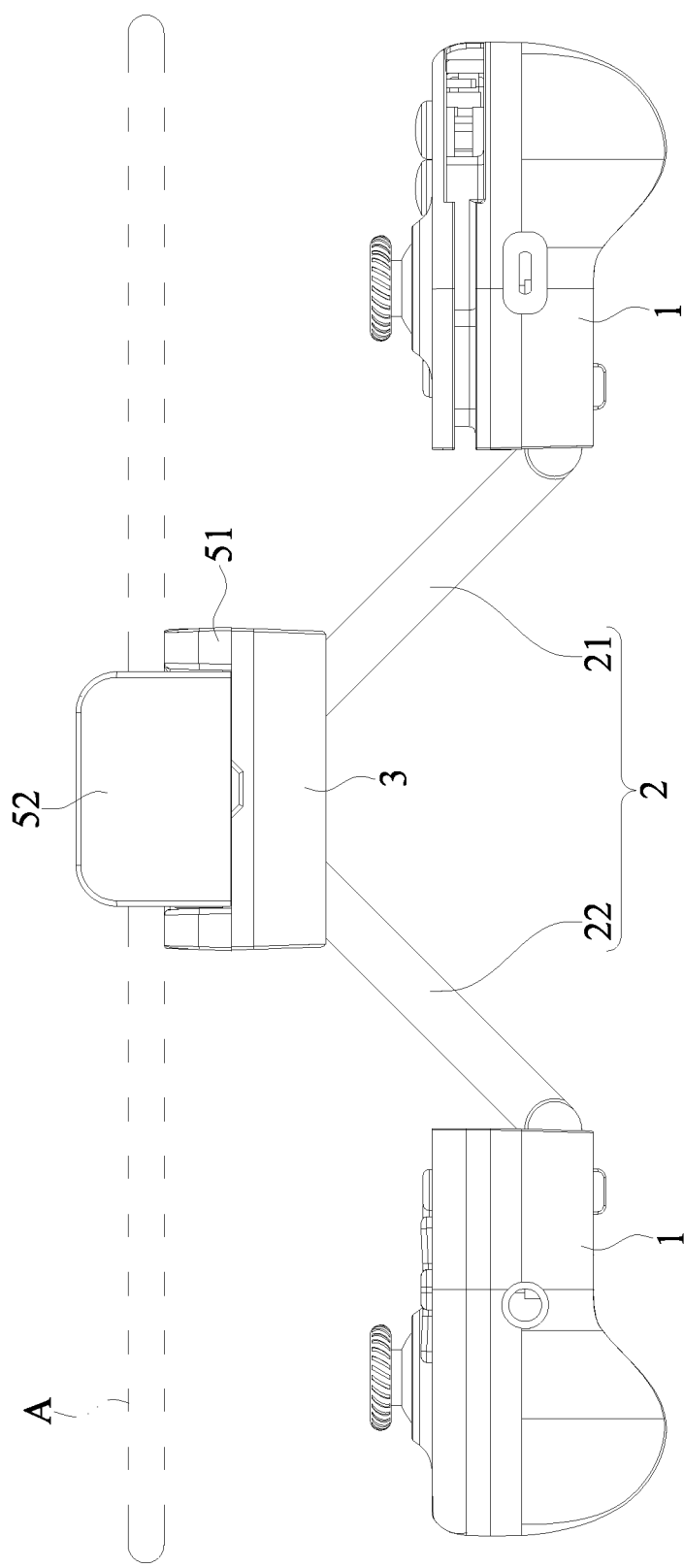
FIG. 13 is a side view of the control device in the operated state according to the eighth embodiment of the present disclosure.

Referring to FIG. 12, which is to be read in conjunction with FIG. 13, FIG. 12 is a perspective view of a control device in an operated state according to an eighth embodiment of the present disclosure, and FIG. 13 is a side view of the control device in the operated state according to the eighth embodiment of the present disclosure. The main difference between the present embodiment and the above-mentioned first embodiment is that: the connection structure 2 includes a first connection arm 21 and a second connection arm 22. One end of the first connection arm 21 is pivotally connected to one of the control handles 1, and another end of the first connection arm 21 is pivotally connected to the support structure 3. One end of the second connection arm 22 is pivotally connected to another one of the control handles 1, and another end of the second connection arm 22 is pivotally connected to the support structure 3. The carrier platform 51 can be operated to move upward (i.e., in the Z1 direction as indicated in FIG. 12) or downward (i.e., the Z2 indicated in FIG. 12) relative to the two control handles 1 through the first connection arm 21 and the second connection arm 22.

The present disclosure does not limit the exact manners of pivotal connection between the first connection arm 21 and the support structure 3, between the first connection arm 21 and the one of the control handles 1, between the second connection arm 22 and the support structure 3, and between the second connection arm 22 and the another one of the control handles 1. As long as the carrier platform 51 can be operated to move upward (i.e., in the Z1 direction as indicated in FIG. 12) or downward (i.e., in the Z2 direction as indicated in FIG. 12) relative to the two control handles 1, the manners of pivotal connection among the first connection arm 21, the second connection arm 22, the support structure 3, and the two control handles 1 can be designed according to practical requirements.

As shown in FIG. 1 and FIG. 12, in a specific embodiment of the present disclosure, the carrier platform 51 can be only switched between the state as shown in FIG. 1 and the state as shown in FIG. 12. The structural design of the above-mentioned perforations, ball and spring can be included in the related pivotal connection structure among the support structure 3, the first connection arm 21, and the second connection arm 22, or can be included in the related pivotal connection structure among the two control handles 1, the first connection arm 21, and the second connection arm 22. When the carrier platform 51 is in the state as shown in FIG. 1 or the state as shown in FIG. 12, the portion of the ball that is urged by the spring enters the adjacent one of the perforations. Accordingly, the user can clearly feel when the carrier platform 51 is correctly positioned at the position as shown in FIG. 1 or the position as shown in FIG. 12. In a different embodiment of the present disclosure, besides being operated to be positioned at the position as shown in FIG. 1 or the position as shown in FIG. 12, the carrier platform 51 can also be operated to move to at least one position between the position as shown in FIG. 1 and the position as shown in FIG. 12.

As shown in FIG. 13, by virtue of the design that the support structure 3 can be operated to move upward (i.e., in the Z1 direction as indicated in FIG. 12), when a large-sized electronic device A (e.g., a tablet computer) is disposed on the carrier platform 51, the carrier platform 51 can be operated by a user to move upward (i.e., in the Z1 direction as indicated in FIG. 12), and the two control handles 1 can be moved toward each other, so that the two control handles 1 are correspondingly located below the electronic device A. Accordingly, the user can hold and operate the two control handles 1 in a relatively comfortable manner.

Figure 14:
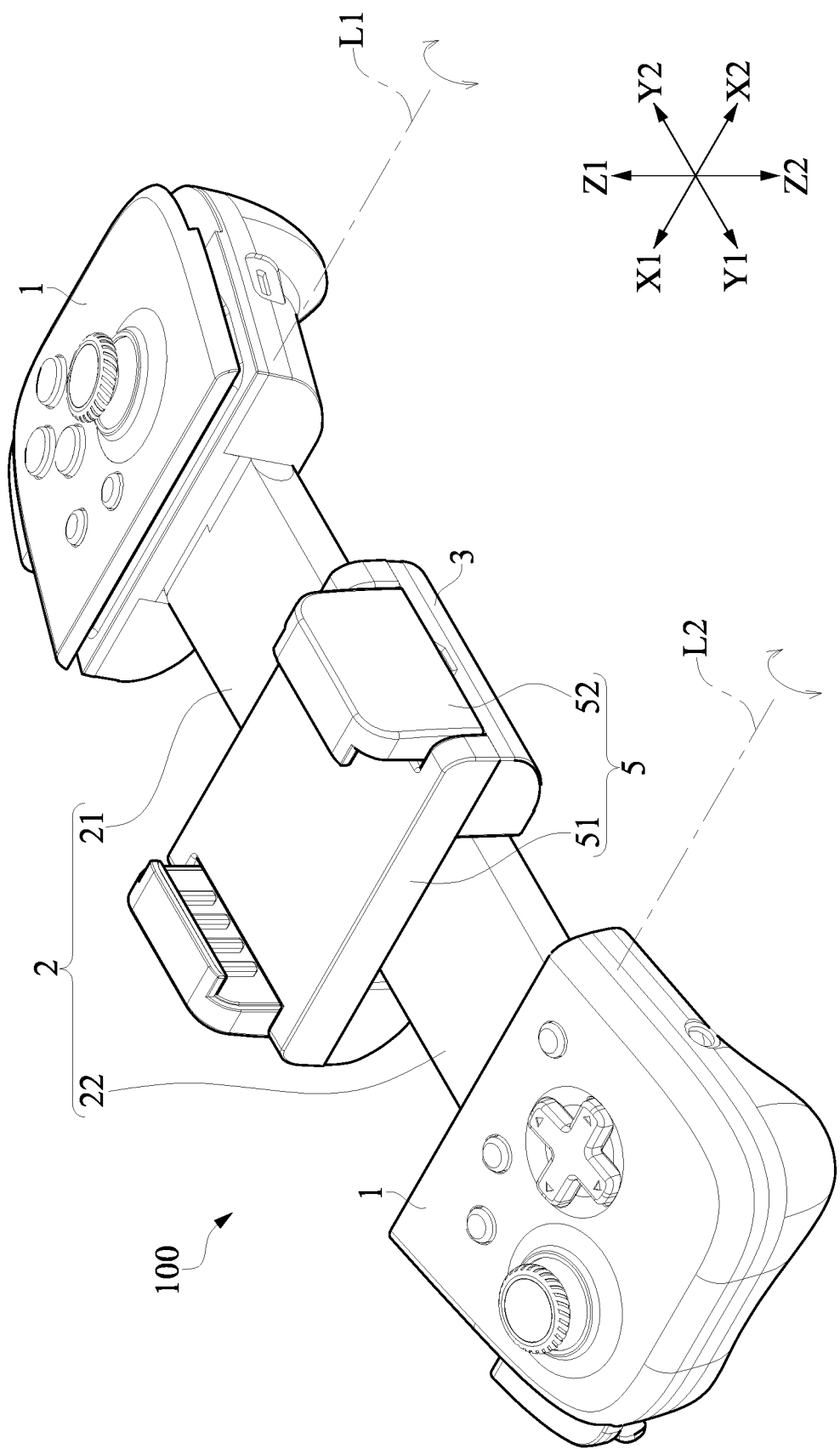
FIG. 14 is a perspective view of two control handles of a control device in an operated state according to a ninth embodiment of the present disclosure.

Referring to FIG. 14, FIG. 14 is a perspective view of two control handles of a control device in an operated state according to a ninth embodiment of the present disclosure. The main difference between the present embodiment and the above-mentioned first embodiment is that: one end of the connection structure 2 is pivotally connected to one of the control handles 1, and another end of the connection structure 2 is pivotally connected to another one of the control handles 1. Each of the control handles 1 can be operated to rotate relative to the connection structure 2. The manner of pivotal connection between the connection structure 2 and each of the control handles 1 is not limited herein. Any structure that enables each of the control handles 1 to be operated to rotate relative to the connection structure 2 belongs to one of the embodiments in which the connection structure 2 and the control handle 1 are pivotally connected to each other.

In short, the control handle 1 located at a right side of the carrier platform 51 in FIG. 14 can be operated to rotate around a first axis L1 in a direction toward or away from the carrier platform 51 (i.e., turning inward or turning outward). The control handle 1 located at a left side of the carrier platform 51 in FIG. 14 can be operated to rotate around a second axis L2 in a direction toward or away from the carrier platform 51 (i.e., turning inward or turning outward).

According to the above configuration, each of the control handles 1 of the control device 100 of the present embodiment can be operated by a user to rotate in a direction away from the carrier platform 51 (i.e., turning outward). Accordingly, when the user holds the two control handles 1 that are turned outward, the user does not need to turn his/her wrist(s) inward, so that a palm or both palms of the user can be turned substantially upward. By virtue of the design that each of the control handles 1 can be turned outward, the control handles 1 can be held more easily by the user, and in various different manners. After using the control handles 1 for a period of time, the user can adjust a posture for holding the control handles 1 by operating each of the control handles 1. Accordingly, the user does not need to hold the two control handles 1 with the same posture for a long period of time.

Figure 15:
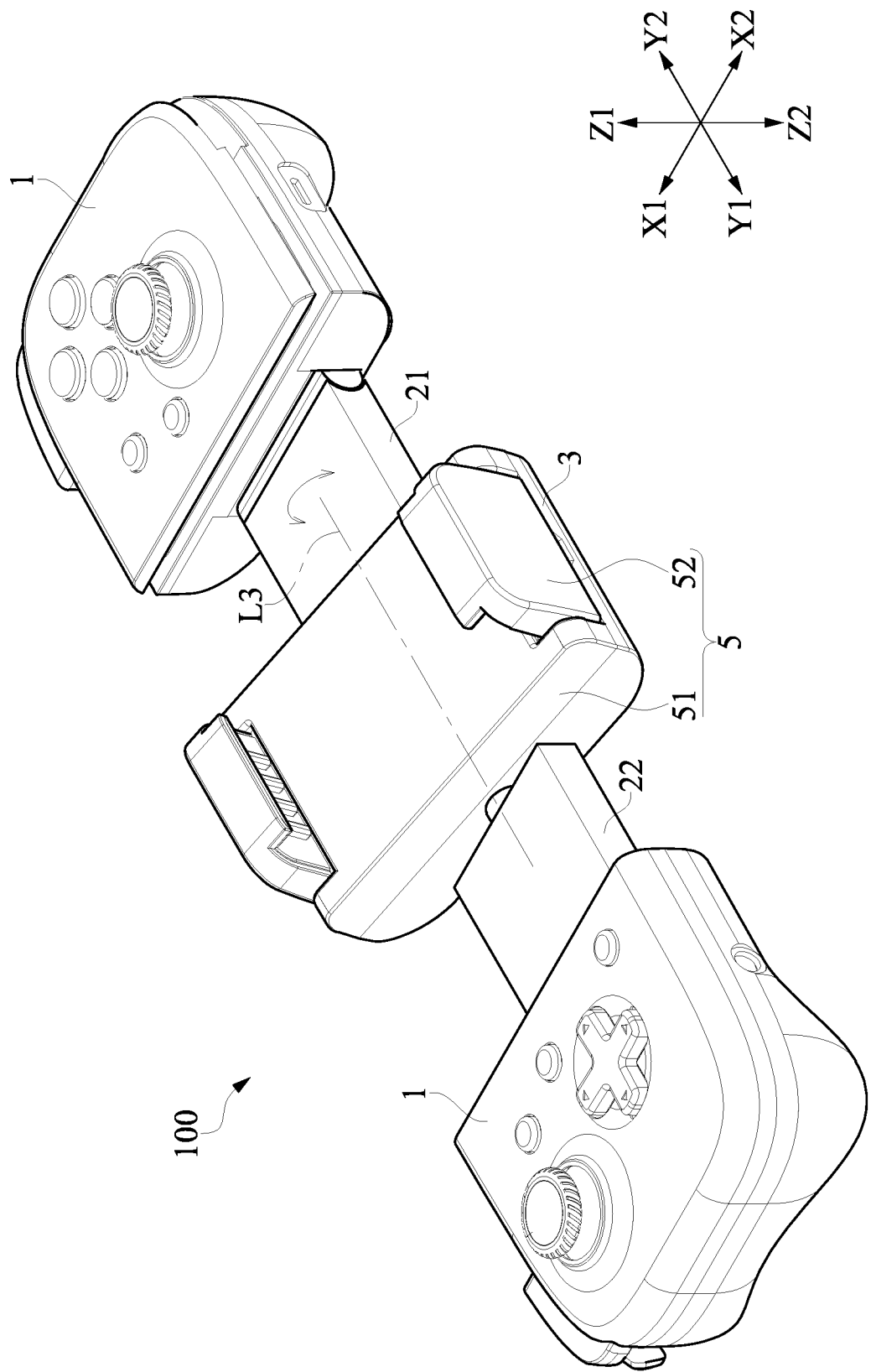
FIG. 15 is a perspective view of a support structure of a control device in an operated state according to a tenth embodiment of the present disclosure.

Referring to FIG. 15, FIG. 15 is a perspective view of a support structure of a control device in an operated state according to a tenth embodiment of the present disclosure. The main difference between the present embodiment and the above-mentioned first embodiment is that: the connection structure 2 includes a first connection arm 21 and a second connection arm 22. The first connection arm 21 is pivotally connected to the support structure 3, and the second connection arm 22 is pivotally connected to the support structure 3. The support structure 3 can be operated to rotate upwardly (i.e., in the Z1 direction as indicated in FIG. 15) or downwardly (i.e., in the Z2 direction as indicated in FIG. 15) with respect to the first connection arm 21 and the second connection arm 22. That is, the support structure 3 can be operated to rotate upwardly (i.e., in the Z1 direction as indicated in FIG. 15) or downwardly (i.e., in the Z2 direction as indicated in FIG. 15) with respect to the connection structure 2 around a third axis L3.

A manner in which the support structure 3 is pivotally connected to the first connection arm 21 and the second connection arm 22 is not limited herein. Any structure that enables the support structure 3 to be operated to rotate relative to the first connection arm 21 and the second connection arm 22 belongs to one of the embodiments in which the support structure 3 is pivotally connected to the first connection arm 21 and the second connection arm 2.

By virtue of the design that the support structure 3 can rotate relative to the first connection arm 21 and the second connection arm 22, the user can change an angle of the electronic device A disposed on the carrier platform 51 and held by the two holding assemblies 52 by operating the support structure 3 according to practical requirements, so that the user can view the electronic device A in a comfortable posture.

Figure 16:
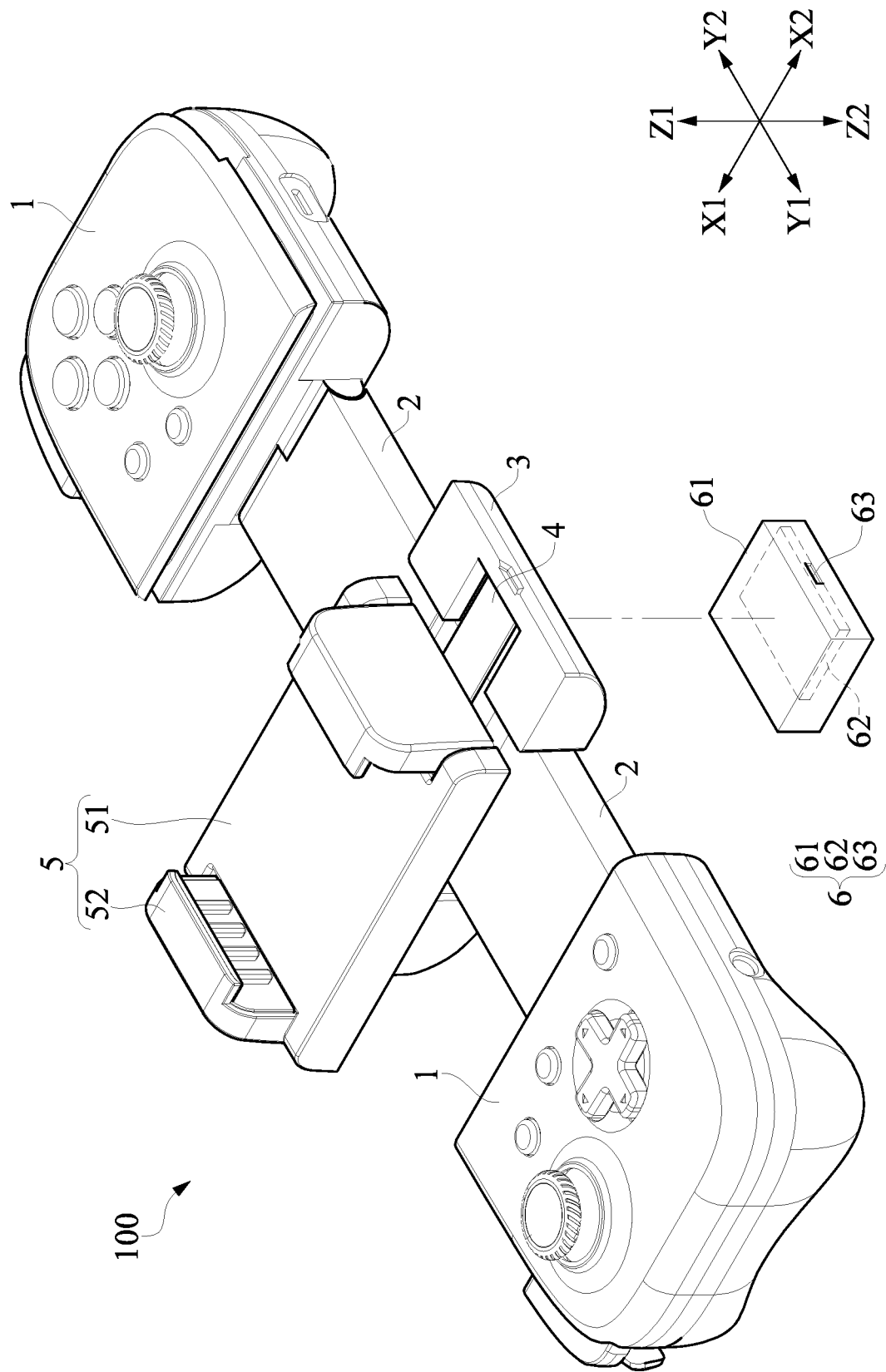
FIG. 16 is a partly exploded view of a control device according to an eleventh embodiment of the present disclosure.
Figure 17:
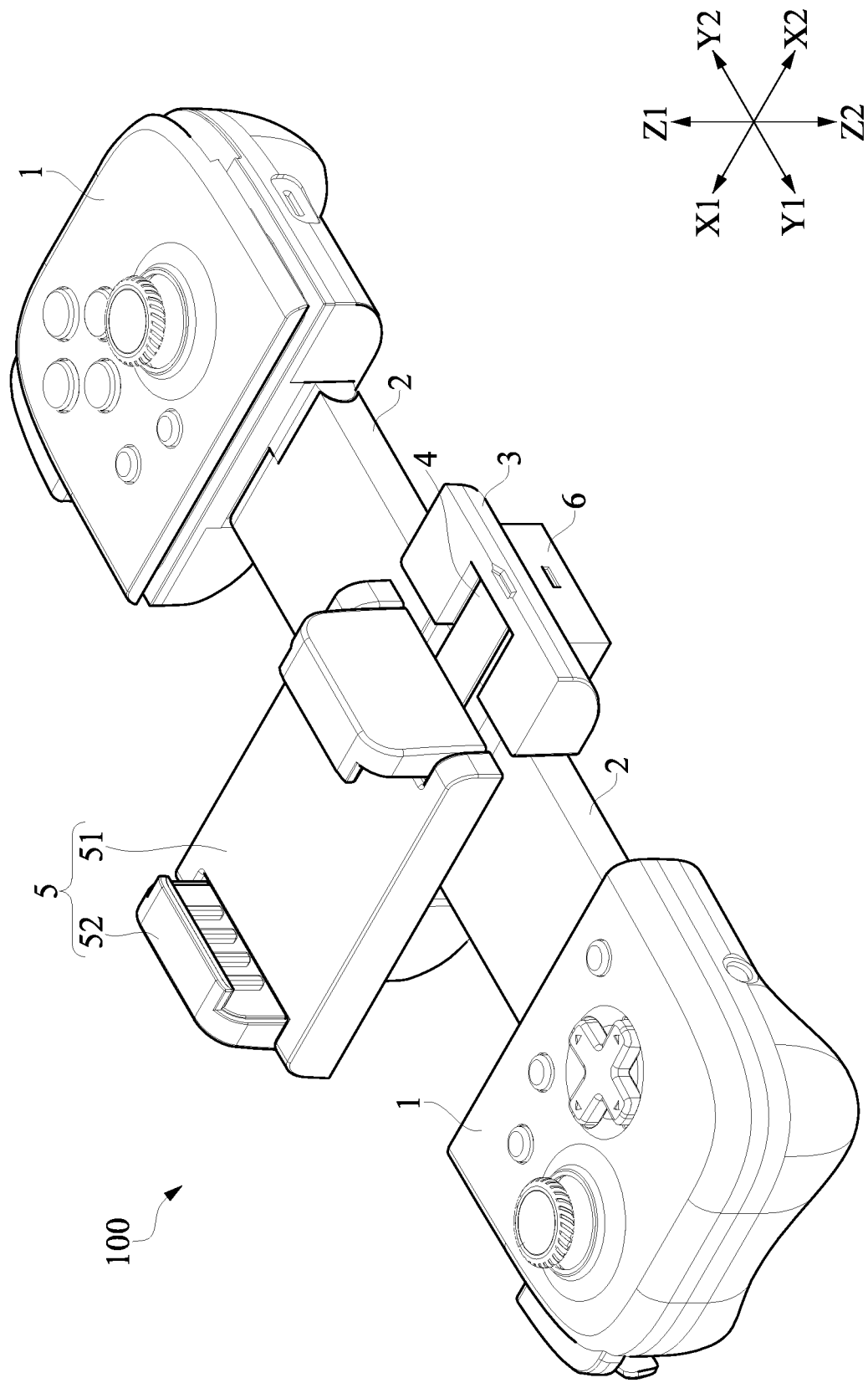
FIG. 17 is a partly assembled view of the control device according to the eleventh embodiment of the present disclosure.

Referring to FIG. 16, which is to be read in conjunction with FIG. 17, FIG. 16 is a partly exploded view of a control device according to an eleventh embodiment of the present disclosure. FIG. 17 is a partly assembly view of the control device according to the eleventh embodiment of the present disclosure. The main difference between the present embodiment and the above-mentioned first embodiment is that: the control device 100 further includes a counterweight module 6. The counterweight module 6 is detachably fixed to a side of the support structure 3 away from the carrier platform 51. The manner in which the counterweight module 6 is detachably fixed to the side of the support structure 3 is not limited herein. For example, the counterweight module 6 can be detachably fixed to the side of the support structure 3 by using a strong magnet. Alternatively, the counterweight module 6 and the support structure 3 can respectively have buckle structures that can be engaged with each other.

In one specific embodiment of the present disclosure, one side of the support structure 3 has a slide rail structure, and the counterweight module 6 has a structure capable of sliding in the slide rail structure. The counterweight module 6 can be operated to move forward (i.e., in the X1 direction as indicated in FIG. 17) or backward (i.e., in the X2 direction as indicated in FIG. 17) relative to the support structure 3.

According to the above configuration, the arrangement of the counterweight module 6 can assist in adjusting an overall center of gravity of the control device 100 on which the electronic device A is disposed, so that a user can easily hold the two control handles 1. Further, when the carrier platform 51 is operated by the user to move forward (i.e., in the X1 direction as indicated in FIG. 17), the overall center of gravity of the control device 100 provided with the electronic device A is forwardly inclined. In particular, when a size of the electronic device A is relatively large and a weight of the electronic device A is relatively heavy, the user must exert a relatively large force to effectively hold the two control handles 1.

Through the design of the counterweight module 6, the control device 100 of the present embodiment enables the user to mount the counterweight module 6 on one side of the support structure 3 when the user mounts the electronic device A having a relatively large size and a relatively heavy weight on the control device 100. Accordingly, the overall center of gravity of the control device 100 provided with the electronic device A is not forwardly inclined, and the user can hold the two control handles 1 in a relatively easy manner.

In a specific embodiment of the present disclosure, the counterweight module 6 includes a casing 61, a rechargeable battery 62, and a connector 63. The rechargeable battery 62 is disposed in the casing 61, the connector 63 is electrically connected to the rechargeable battery 62, and a portion of the connector 63 is exposed from the casing 61. The connector 63 is configured to be connected to an electrical connection line. The rechargeable battery 62 can provide power to the electronic device A disposed on the carrier platform 51, or provide power to the two control handles 1 through the electrical connection line. The connector 63 can be various types of universal serial bus (USB), but the present disclosure is not limited thereto.

That is, after the counterweight module 6 including the rechargeable battery 62 is mounted on one side of the support structure 3 by a user, the counterweight module 6 can not only assist in adjusting the overall center of gravity of the control device 100 provided with the electronic device A, but also charge the electronic device A or the control handles 1 by using the rechargeable battery 62 disposed in the counterweight module 6.

It should be noted that, except for each of the distinctive features mentioned in the third to seventh embodiments, which cannot be combined with each other, other features among the above-mentioned embodiments can be freely combined with each other according to practical requirements to form new manners of implementation.

Beneficial Effects of the Embodiments

In conclusion, the control device of the present disclosure enables a user to adjust a position of the carrier platform relative to the two control handles according to practical requirements. Therefore, a user can hold the two control handles in a relatively comfortable manner. After holding the control handles for a period of time, the user can change a placement of the electronic device by adjusting a position of the carrier platform, a position of the control handles, or a position of the support structure, so that the posture for holding the two control handles with both hands can be changed. Therefore, the problem of muscle soreness caused by holding the two control handles in the same posture over an extended period of time can be greatly improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A control device for holding an electronic device, the electronic device having a display, the control device comprising:
   two control handles each including a plurality of operation units, wherein each of the operation units is operable to send a control signal to the electronic device;
   a connection structure connected between the two control handles, the two control handles having an accommodation space formed therebetween;
   a support structure disposed on the connection structure, and located between the two control handles;
   a moving mechanism disposed on the support structure; and
   a movable module including:
      a carrier platform configured to carry the electronic device, the carrier platform being connected to the moving mechanism, and the carrier platform being operable to move relative to the support structure by the moving mechanism; and
      at least two holding assemblies connected to the carrier platform, wherein the at least two holding assemblies being configured to hold the electronic device that is disposed on the carrier platform;
   wherein the carrier platform is operable to move forwards or backwards relative to the two control handles by the movement mechanism, and the electronic device that is disposed on the carrier platform and held by the at least two holding assemblies is capable of moving forward or backward along with the carrier platform relative to the two control handles;

wherein the moving mechanism includes at least one guide structure and at least one slide block, the at least one slide block is connected to the carrier platform, the at least one guide structure includes at least one arc section, and the carrier platform is movable along the at least one arc section of the at least one guide structure by the at least one slide block to move upward and forward relative to the two control handles.

2. The control device according to claim 1, wherein the at least one guide structure further includes at least one linear section, and the carrier platform is capable of being moved backward relative to the two control handles by the at least one slide block along the at least one linear section of the at least one guide structure.

3. The control device according to claim 1, wherein the at least one guide structure includes two of the at least one arc section and a linear section, the linear section is located between the two arc sections, the carrier platform is movable along one of the two arc sections by the at least one slide block to move upward and forward relative to the two control handles, and the carrier platform is movable along another one of the two arc sections by the at least one slide block to move upward and backward relative to the two control handles.

4. The control device according to claim 1, wherein each of the control handles has an accommodation groove formed therein, and the accommodation groove is able to accommodate a part of the connection structure, so that a distance between each of the control handles and the support structure is capable of being shortened.

5. The control device according to claim 1, wherein the connection structure includes a first connection arm and a second connection arm, one end of the first connection arm is pivotally connected to one of the control handles, another end of the first connection arm is pivotally connected to the support structure, one end of the second connection arm is pivotally connected to another one of the control handles, and another end of the second connection arm is pivotally connected to the support structure; wherein the carrier platform is operable to move upward or downward relative to the two control handles by the first connection arm and the second connection arm.

6. The control device according to claim 1, further comprising a counterweight module that is detachably fixed to the support structure.

7. The control device according to claim 6, wherein the counterweight module includes a casing, a rechargeable battery, and a connector; wherein the rechargeable battery is disposed in the casing, the connector is electrically connected to the rechargeable battery, and a portion of the connector is exposed from the casing; wherein the rechargeable battery is configured to provide power to the electronic device disposed on the carrier platform, or to provide power to the two control handles.

8. The control device according to claim 1, wherein the connection structure includes a first connection arm and a second connection arm, the first connection arm is pivotally connected to the support structure, the second connection arm is pivotally connected to the support structure, and the support structure is operable to rotate upwardly or downwardly relative to the first connection arm and the second connection arm.

9. The control device according to claim 1, wherein one end of the connection structure is pivotally connected to one of the control handles, and another end of the connection structure is pivotally connected to another one of the control handles; wherein each of the control handles is operable to rotate relative to the connection structure.

* * * * *